(12) United States Patent
Warnes

(10) Patent No.: US 11,901,824 B2
(45) Date of Patent: Feb. 13, 2024

(54) VARIABLE DC-DC CONVERTER AND NO-LOAD CLAMP

(71) Applicant: Murata Manufacturing Co., Ltd., Nagaokakyo (JP)

(72) Inventor: Frank Warnes, Milton Keynes (GB)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 17/159,061

(22) Filed: Jan. 26, 2021

(65) Prior Publication Data

US 2021/0152092 A1 May 20, 2021

Related U.S. Application Data

(63) Continuation of application No. PCT/GB2019/052099, filed on Jul. 26, 2019.

(30) Foreign Application Priority Data

Jul. 27, 2018 (GB) .................................... 1812257

(51) Int. Cl.
*H02M 3/335* (2006.01)
*H02M 1/15* (2006.01)
*H02M 1/00* (2006.01)

(52) U.S. Cl.
CPC ......... *H02M 3/33523* (2013.01); *H02M 1/15* (2013.01); *H02M 3/33553* (2013.01); *H02M 3/33569* (2013.01); *H02M 1/0032* (2021.05)

(58) Field of Classification Search
CPC ............ H02M 3/22; H02M 3/24; H02M 3/28; H02M 3/315; H02M 3/3155; H02M 3/335;

(Continued)

(56) References Cited

U.S. PATENT DOCUMENTS

| 4,996,520 A * | 2/1991 | Williams | ............ G01R 19/165 340/661 |
| 7,482,765 B2 * | 1/2009 | Ito | .......................... H05B 45/52 315/312 |
| 2016/0087542 A1 * | 3/2016 | Warnes | .................. H02M 1/08 363/21.05 |

FOREIGN PATENT DOCUMENTS

| JP | 57-185523 A | 11/1982 |
| JP | 63-59766 A | 3/1988 |

(Continued)

OTHER PUBLICATIONS

English translation of JPS57185523. (Year: 1982).*

(Continued)

*Primary Examiner* — Thienvu V Tran
*Assistant Examiner* — Carlos O Rivera-Perez
(74) *Attorney, Agent, or Firm* — Keating & Bennett, LLP

(57) ABSTRACT

A variable DC-DC converter includes a no-load voltage clamp in which a rectified, filtered, and loaded control signal drives a switch. The switch switches in a load resistance across the output terminals of the converter when the output terminals are unloaded or lightly loaded. Due to a combined rectification, smoothing, and filtering operation of the control signal circuit, the control signal provides a steady voltage of the output voltage selected by a user of the converter based on predetermined output requirements. The control signal is therefore not subject to the voltage spikes that the main output is subject to. The circuit compares the control signal to the output voltage, and switches in the load resistance when the voltage at the output rises above the control signal.

16 Claims, 8 Drawing Sheets

(58) Field of Classification Search
CPC ......... H02M 3/33507; H02M 3/33515; H02M 3/33523; H02M 3/3353; H02M 3/33538; H02M 3/33546; H02M 3/33553; H02M 3/33569; H02M 3/33576; H02M 1/0032; H02M 1/0035; H02M 1/32; H02M 1/322; H02M 1/34–348; H02M 1/36; H02M 1/14–15; Y02B 70/10
USPC ..... 363/15–21.18, 44–48, 50, 52, 53, 56.05, 363/56.08, 56.11, 56.12, 123–127; 323/271–276, 282–287, 298, 351; 361/54, 56, 78, 79, 86, 88–92, 111
See application file for complete search history.

(56) References Cited

FOREIGN PATENT DOCUMENTS

| | | |
|---|---|---|
| JP | 05-80185 U | 10/1993 |
| JP | 06-339625 A | 12/1994 |

OTHER PUBLICATIONS

English translation of JPS6359766. (Year: 1988).*
Official Communication issued in International Patent Application No. PCT/GB2019/052099, dated Oct. 8, 2019.

* cited by examiner

VARIABLE DC-DC CONVERTER AND NO-LOAD CLAMP

CROSS REFERENCE TO RELATED APPLICATIONS

This application claims the benefit of priority to GB Patent Application No. 1812257.2 filed on Jul. 27, 2018 and is a Continuation Application of PCT Application No. PCT/GB2019/052099 filed on Jul. 26, 2019. The entire contents of each application are hereby incorporated herein by reference.

BACKGROUND OF THE INVENTION

1. Field of the Invention

The present invention relates to a variable DC-DC converter, and in particular to a variable DC-DC converter including a no-load clamp.

2. Description of the Related Art

Isolated DC-DC converters use a transformer to electrically isolate a DC power supply side of the converter from a DC output side of the converter. A switch in the DC supply circuit switches on and off a primary winding of the transformer which induces a voltage in the secondary winding which is coupled to the DC output circuit. A pulse width modulator (PWM) controller operates the switch to provide the switched voltage in the primary transformer winding. The switched voltage is transferred to the secondary winding by magnetic coupling, and the DC output voltage is derived by a combination of rectification and filtering of the secondary winding voltage. The voltage output at the transformer primary is a function of the switched-on time ($T_{on}$) of the switch in each switching cycle $T_{total}$. The DC voltage at the output is a function of the ratio of $T_{on}/T_{total}$ (the duty cycle) and the input voltage.

To provide closed loop control of the switch, a further winding may be provided on the transformer in phase with the output side winding. This is designed to allow the PWM controller to detect over-voltages and reduce the Ton of the switch to lower the voltage.

In a DC-DC converter, the DC output side circuitry conventionally includes a diode or diodes and a smoothing circuit. When the voltage is induced in the secondary winding by the primary winding, power is applied across the output terminals and also stored in the capacitor or inductor of the smoothing circuit. When the capacitor or inductor is charged and the current collapses in the secondary winding, the voltage discharges over the output providing a constant output voltage across the output connection terminals.

In normal operation, the DC output of the DC output side of the converter is loaded, and the secondary winding supplies a voltage through the diode when induced by the primary windings. The voltage supplied by the secondary winding charges a smoothing circuit and supplies power to the load. The capacitor charges up to a predetermined value and then discharges over the load. This means that the voltage at the secondary winding increases to match the supply side voltage (multiplied by the transformer turns ratio).

A problem occurs when there is no load, or a very small load, connected across the DC output. In this state the voltage at the secondary winding can increase to more than 200% of the supply side voltage (multiplied by the turns ratio). This is due to undamped leakage inductance in the transformer. In normal operation, the voltage supplied by the leakage inductance is dissipated across the load. When the output is unloaded this voltage charges the capacitor, causing the voltage at the output to increase up to the voltage supplied by the leakage inductance, i.e., more than 200% of the expected voltage.

A further problem occurs due to the leakage inductances which are seen across the unloaded secondary windings. As the voltage at the output increases, due to there being no load to dissipate across, the PWM controller tries to reduce the Ton further and further to make up for the over-voltage at the output. At a certain point, the PWM controller cannot reduce the switched-on time $T_{on}$ any further. This means that the PWM may not be able to achieve the low end of the converter's control because the circuit's required $T_{on}$, to provide the lowest rated output voltage, is longer than the PWM's minimum $T_{on}$.

Mechanical and software solutions have been developed to address the problem of over-voltage at the output in lightly loaded or unloaded DC-DC converters. These have included attempts to improve the coupling between the windings to reduce the leakage inductance, as well as introducing pulse-skipping in the PWM which effectively multiplies the $T_{total}$ to allow for longer $T_{on}$ times at lower voltages. These invariably affect the reliability and ripple voltage of the device.

Circuitry based solutions are also known from the prior art. For example, an output circuit where a load resistor is permanently connected across the output, is shown in FIG. 2 as will be described later. This is a brute force type solution, which will prevent the problems associated with a lightly or unloaded output, but at the cost of having a constant load providing considerable inefficiency and reducing the maximum current capability of the circuit.

A second example may have an opto-isolator circuit which attempts to increase the reliability of the feedback circuit. This solves the problem of the leakage inductance effects not being reflected in the auxiliary feedback winding, and reduces the duty cycle, but does not solve the problem of minimum $T_{on}$. This is a complex and costly solution for a comparatively inexpensive piece of equipment.

A third example may have an output circuit with a Zener diode connected across the output, which will clamp at a voltage slightly higher than the output voltage (such as when the over-voltage spikes are present). This method can be applied to a fixed output dc-dc converter, but is not suitable for an adjustable DC-DC converter.

A fourth example may have an output circuit incorporating a constant current minimum load which is switched in when the output load goes below the minimum load level. However, this also presents a permanent loss because of the current sense resistor and causes inaccuracy in the output voltage.

JP63-059766 shows a voltage clamp for a converter, which can switch in an internal load resistor when the main output of the converter rises above a predetermined value. A voltage divider provides a fixed reference voltage to the base of a transistor. Due to the way that the reference voltage is generated, the circuit does not operate sufficiently when connected to a variable DC-DC converter. The values of the resistors which make up the potential divider have to be selected for the predetermined output voltage. There exists a need for a truly variable no-load voltage clamp for a variable DC-DC converter.

SUMMARY OF THE INVENTION

Preferred embodiments of the present invention introduce an internal load across an output only when a converter is unloaded or lightly loaded and presenting over-voltage spikes at transformer secondary windings, and prevent the internal load from being introduced across the output when an external load is connected across the output so as not to introduce a constant load which causes a permanent inefficiency in a circuit.

A variable DC-DC converter according to a preferred embodiment of the present invention includes an input circuit connected to a primary winding, the input circuit including a switch to switch a voltage across the primary winding and a controller to supply a driving frequency to the switch to output a predetermined voltage at the output, and an output circuit connected to a secondary winding, the secondary winding including a pair of winding terminals. The output circuit includes a first rectifier, a pair of output terminals coupled respectively to each of the pair of winding terminals, a smoothing circuit connected between the pair of output terminals, and a voltage clamp connected between the pair of winding terminals. The voltage clamp includes a switch, connected between the pair of winding terminals, to connect or disconnect a shunt load between the pair of output terminals, a low-pass filter connected between the pair of winding terminals and including a filter output, wherein the filter output outputs a control signal to the switch, a second rectifier connected in series with the low-pass filter, and a load resistance connected to the filter output to load the low-pass filter. The low-pass filter provides the control signal output to the switch to connect the shunt load across the pair of winding terminals when an actual voltage across the pair of output terminals becomes higher than the predetermined voltage and to disconnect the shunt load across the pair of winding terminals at other times.

The low-pass filter may include a resistance and a capacitor connected in series across the pair of winding terminals, the low-pass filter being located between the resistance and the capacitor. The switch may include a bipolar junction transistor including a base connected to the low-pass filter, and a collector and an emitter connected between the pair output terminals.

The switch may include an operational amplifier, an inverting input of the operational amplifier may be connected to the low-pass filter, and a non-inverting input and output of the operational amplifier may be connected between the pair of output terminals. The voltage clamp may include a third rectifier, and the non-inverting output may be connected to the pair of output terminal via the third rectifier.

The smoothing circuit may include a capacitor connected in parallel between the pair of output terminals. The smoothing circuit may further include an inductor in series with the capacitor.

The converter may be a flyback converter or a forward converter. The shunt load may include a shunt resistor.

During operation, the actual voltage across the pair of output terminals may become higher than the predetermined voltage due to leakage inductance between the primary winding and the secondary winding. During operation, the actual voltage across the pair of output terminals may become higher than the predetermined voltage due to a minimum on-time limitation of the controller.

The first, second, or third rectifiers may include diodes.

The variable DC-DC may further include a second primary winding connected to the controller via the smoothing circuit and a voltage divider. The voltage divider may be connected to ground, and a ground-leg of the voltage divider may include a variable resistance. A duty cycle of a driving frequency may be set by a combination of a second primary winding voltage and the variable resistance.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

A DC output side circuit for a DC-DC converter is described below in which a rectified, filtered and loaded output, referred to herein as a control signal, drives a switch, for example, a transistor. The switch is able to switch in a load resistance across the output terminals when the terminals are unloaded or lightly loaded. The control signal is not subject to the over-voltage issues that the main output is subject to. Due to a combined rectification, smoothing, and filtering performed by the control signal circuit, the control signal presents a steady voltage of a predetermined voltage. The predetermined voltage is the output voltage selected by a user of the converter based on predetermined output requirements. A rectified and unloaded main DC output is connected across the collector and emitter of the transistor, along with an internal load resistor. When the voltage at the emitter becomes higher than the loaded voltage (that is, when there is no load across the output terminals) by an amount greater than the transistor base/emitter voltage, the transistor allows current flow through the emitter and collector and switches in the internal load resistor to damp the over-voltage spikes. Accordingly, the circuit effectively compares the control signal to the output voltage, and switches in the internal load resistance when the voltage at the output rises above the control signal.

Alternatively, the transistor may be replaced with an operational amplifier operating, for example, as a comparator, or replaced with an NPN transistor in which the load resistor is switched in when the base is higher than the emitter voltage.

Figure 1A:
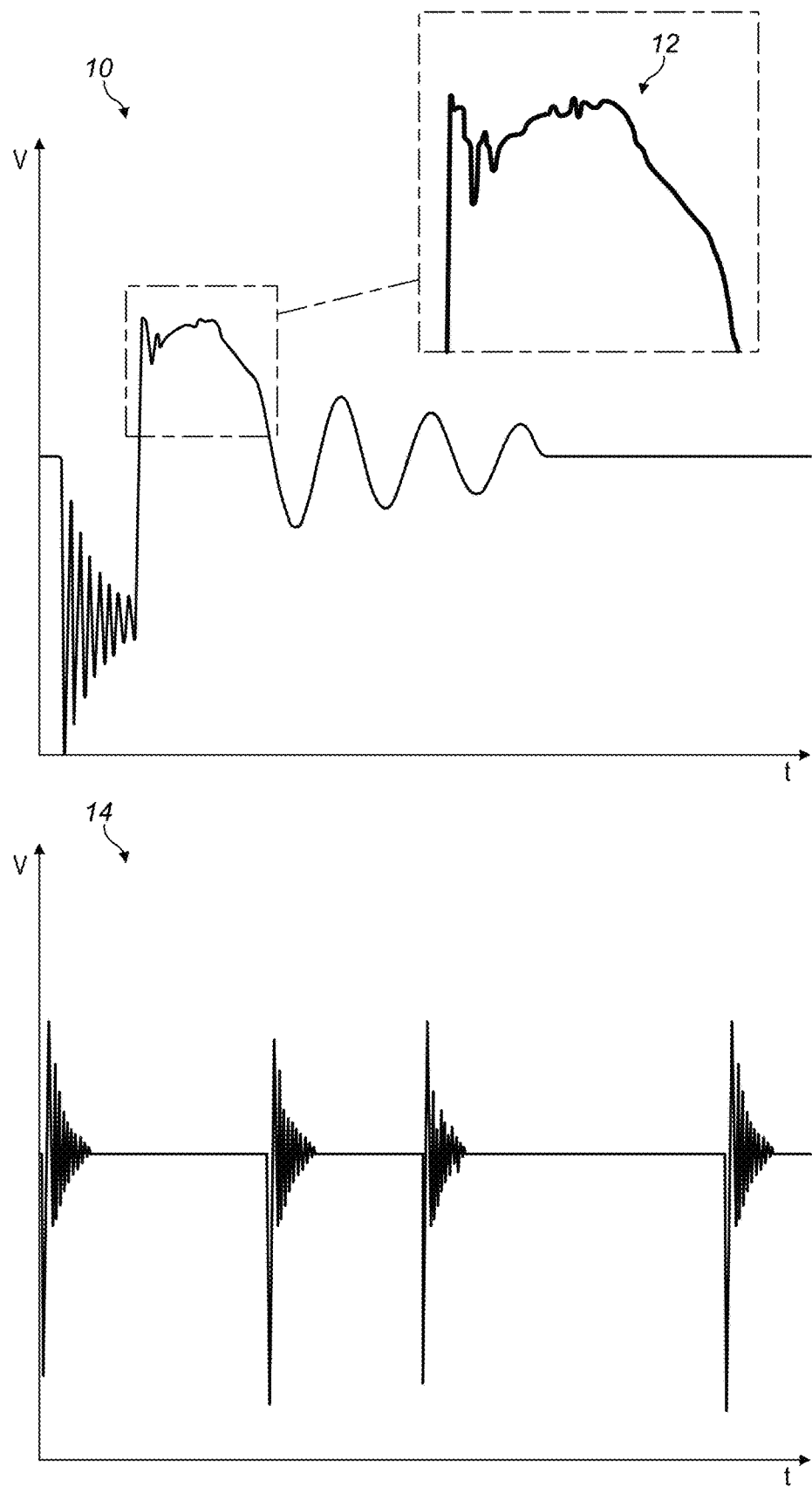
FIG. 1A is a set of voltage/time graphs showing the secondary winding voltage waveform of an unloaded output of a DC-DC converter.

FIG. 1A shows an example of an un-loaded output voltage waveform measured across the secondary side winding of a DC-DC converter that does not include the features of preferred embodiments of the present invention. The first diagram 10 in FIG. 1A shows the waveform at the secondary windings. The waveform first goes negative, which reflects the primary switch connecting the primary winding across Vin. During this period, primary current rises due to the inductance of the winding. When the primary winding is disconnected, it transfers the stored energy to the secondary winding and the voltage rises quickly in the positive direction. During this period, secondary current is delivered to the output capacitor. As there is no load to discharge the capacitor and damp the secondary voltage waveform there is a spike that appears on the leading edge of the waveform and the waveform has a curved top causing the output capacitor to charge up to a higher voltage This is shown in the magnified waveform portion in the second diagram 12 of FIG. 1A. In response, the PWM controller attempts to reduce the duty cycle further than is possible. The third diagram 14 in FIG. 1A shows a longer time scale of the waveform, and the third diagram 14 shows that a minimum duty cycle cannot be reached and the PWM controller attempts to reduce the output voltage by missing pulses.

Figure 1B:
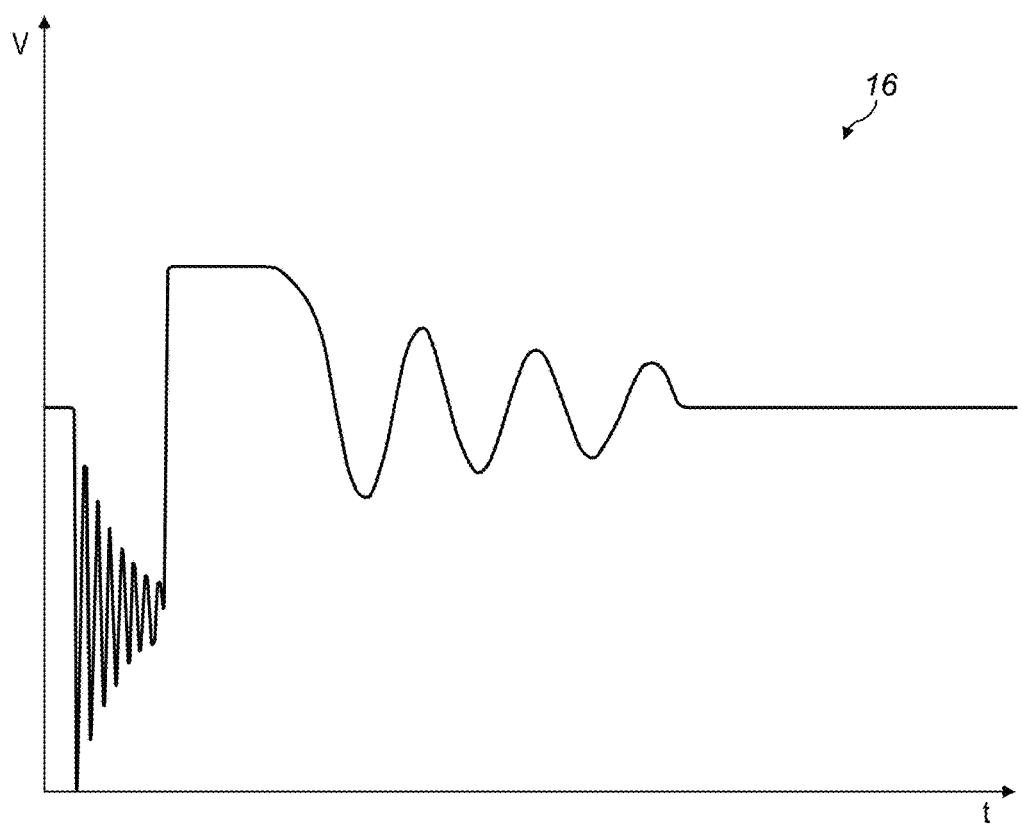
FIG. 1B is a set of voltage/time graphs showing the secondary winding voltage waveform of the output of a DC-DC converter incorporating a preferred embodiment of the present invention.
Figure 1B:
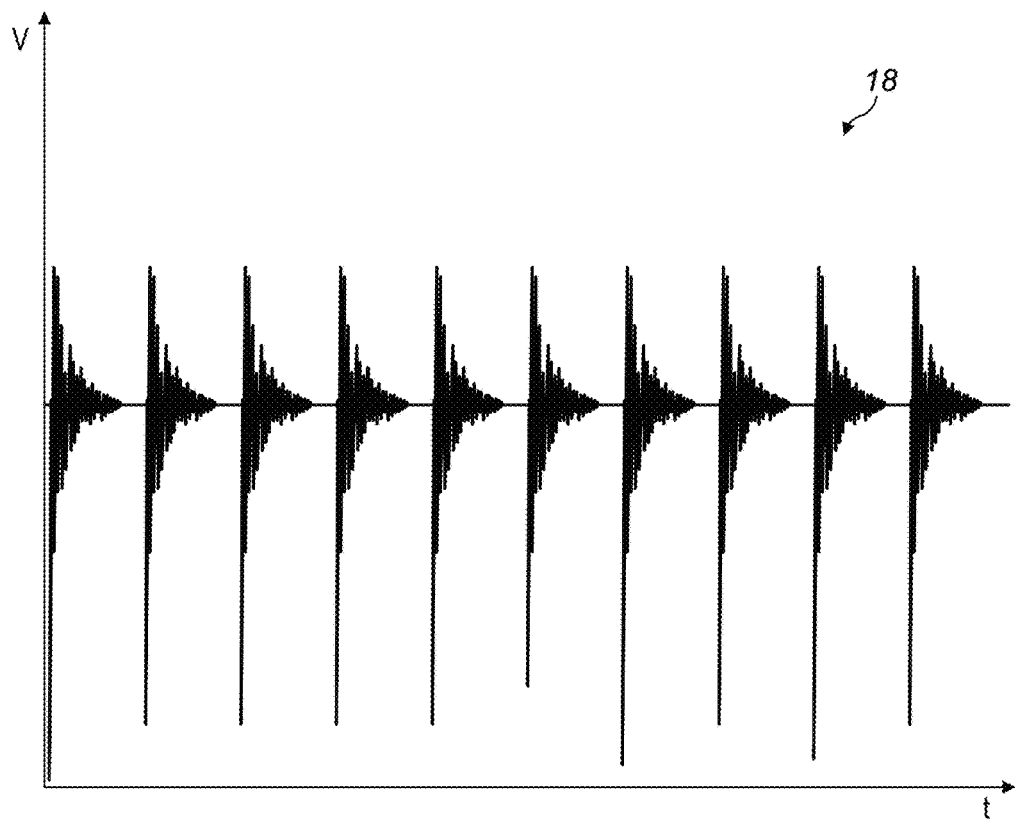

The first diagram 16 in FIG. 1B shows an example of a loaded output voltage waveform measured across the secondary side winding of a transformer of a DC-DC converter. As shown in the first diagram 16 of FIG. 1B, when the output of the DC-DC converter is loaded, there is no voltage spike before the steady voltage is established. Accordingly, the PWM controller is able to produce continuous pulses at or above the minimum duty cycle, as shown in the second diagram 18 in FIG. 1B.

A circuit including the no-load clamp described below will present a waveform similar to the one shown in FIG. 1B regardless of whether or not an external load is connected.

Figure 2:
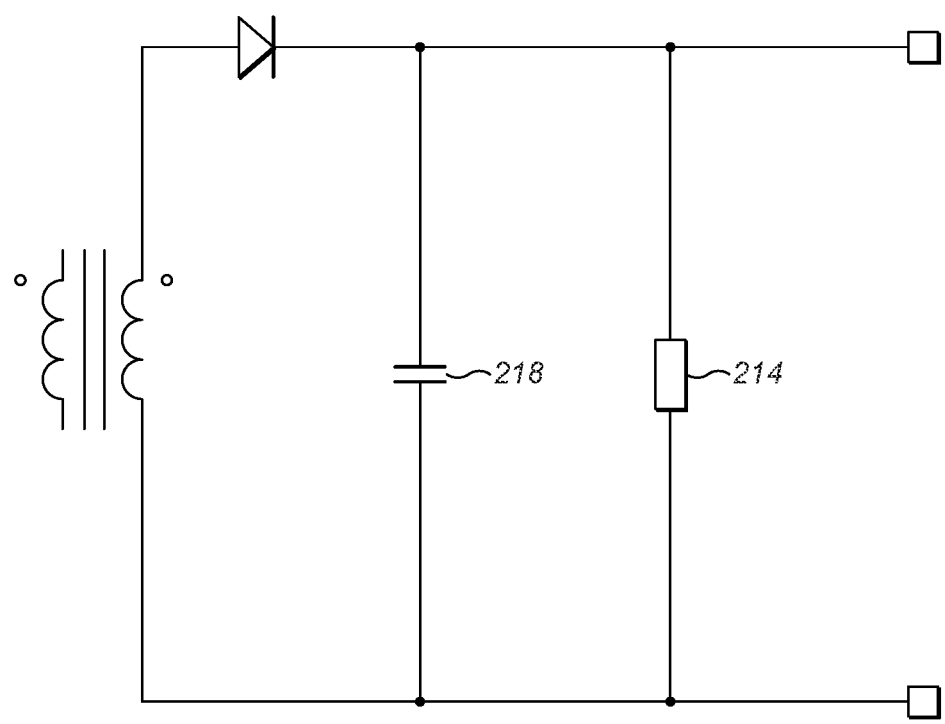
FIG. 2 shows a prior art circuit diagram of a no load clamp for a DC-DC converter.

FIG. 2 shows a circuit diagram describing a first prior art circuit which has a permanent load resistor 214 connected across the output. The load resistor allows the capacitor 218 to discharge across the output when no external load is connected, however the resistor presents a constant resistance to the circuit which inhibits the current capacity of the circuit, and the current draw of the constant resistance is increased if the output is adjusted to a higher voltage.

Figure 3:
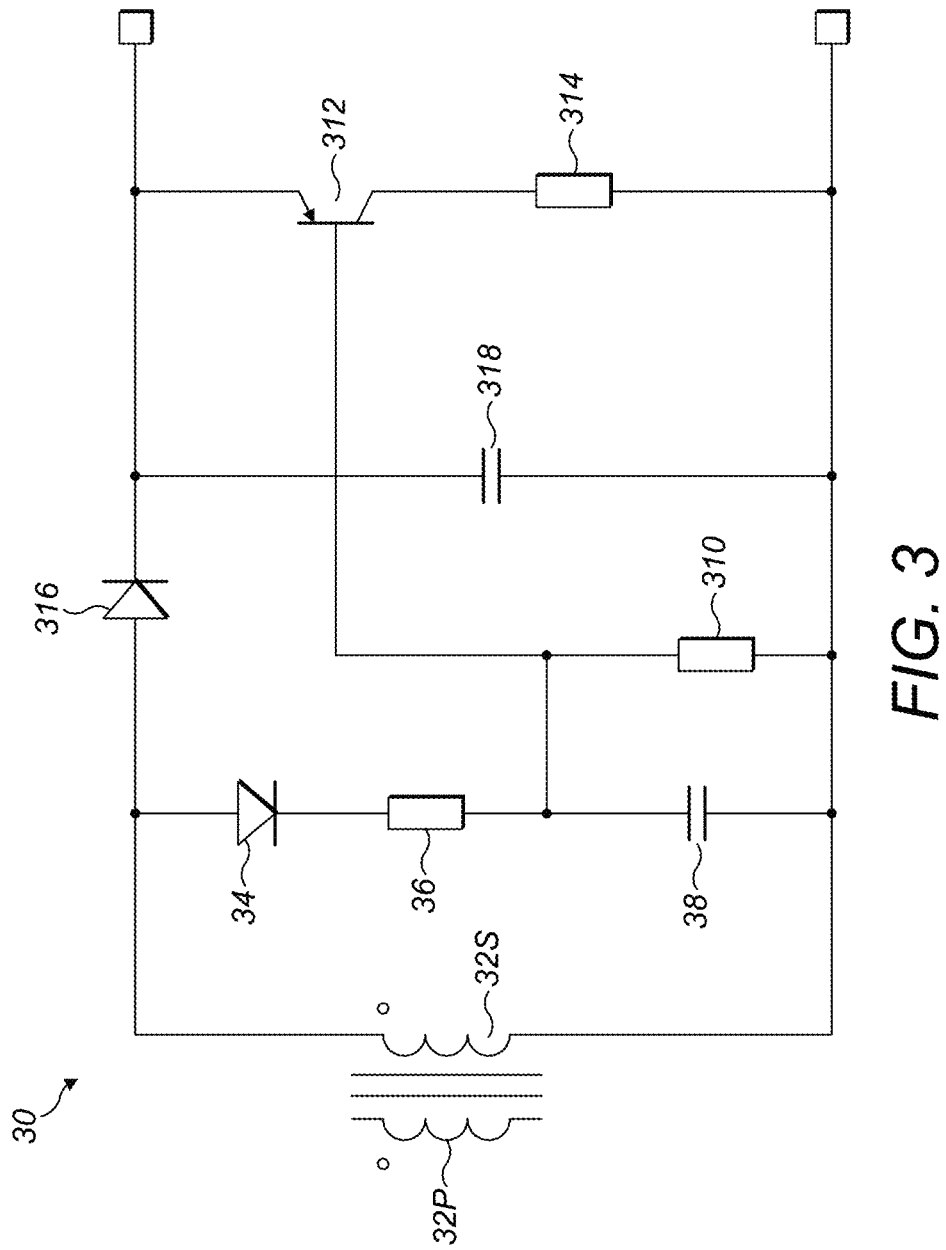
FIG. 3 is a circuit diagram describing a first preferred embodiment of the present invention.

FIG. 3 shows a circuit diagram according to a first preferred embodiment of the present invention. The circuit 30 defines a no-load clamp for an isolated adjustable DC-DC converter as applied to the secondary winding 32S of an adjustable DC-DC converter. Rectifier 316 is connected by its anode to a first terminal of the secondary winding 32S. The cathode of rectifier 316 is connected via capacitor 318 to the second terminal of the secondary winding 32S. Rectifier 34 is connected by its anode to the first terminal of the secondary winding 32S before rectifier 316. Resistance 36 is connected by a first end to the cathode of rectifier 34. Capacitor 38 and resistance 310 are connected in parallel by a first end to the second end of resistance 36. The second ends of capacitor 38 and resistance 310 are connected to the second output of the secondary winding 32S. The node created by the connection of capacitor 38 and resistance 310 to the second end of resistance 36 (node 36-38-310) is connected to the base of transistor 312. The collector of transistor 312 is connected via internal load resistor 314 to the second terminal of the secondary winding 32S. The emitter of transistor 312 is connected to the cathode of rectifier 316. The primary and secondary windings define a transformer.

The primary and secondary windings provide an isolated link between a DC supply side connected to the primary winding 32P and a DC output side connected to the secondary winding 32S. Rectifiers 34 and 316 force the direction of current travel in the circuit and are thus connected to the positive side of the transformer secondary winding 32S.

Rectifier 34 along with capacitor 38 operate as a rectified output of the secondary winding 32S across the load resistor 310. This provides a permanently loaded output across the base of transistor 312 and the 0V terminal of the secondary winding 32S. The voltage supplied by the secondary winding 32S charges capacitor 38, which then discharges across resistance 310 providing a rectified output. As described above, without the resistance 310, the output would be subject to high ripple voltages.

In addition, resistance 36 and capacitor 38 define a low-pass RC filter that provides a more stable output across the base of transistor 312 and the 0V terminal of the secondary winding 32S. With resistance 310 providing a load across the rectifying circuit defined by rectifier 34 and capacitor 38, and also with the filtering performed by resistance 36 and capacitor 38, a rectified output which overcomes the problems of an unloaded DC output of a DC-DC converter is provided. Particularly, because of the filtering action of resistance 36 and capacitor 38, and the current gain of the transistor 312, resistance 310 is able to have a high value, and therefore low leakage current. This load is negligible in comparison to a load required to stabilize the main output of the DC output side of the DC-DC converter. As described above, a permanent high load resistor that is able to provide the required load to stabilize the DC output causes inefficiencies and lowers the maximum current capacity of the output.

In the first preferred embodiment described by circuit 30, transistor 312 is a PNP transistor. A PNP transistor will switch on when the voltage applied at the base is low compared to the voltage applied at the emitter. The voltage at the base must be lower than the voltage at the emitter by a certain amount to allow current flow through the transistor. Typically, the voltage difference is approximately 0.6V.

The base of transistor 312 receives the control signal from the rectifier/filter circuit of components 34 to 310. Due to the operation of components 34 to 310, this voltage will be an accurate output voltage corresponding to the predetermined output voltage. However, this voltage is not suitable for use as the main output voltage of the DC-DC converter, as the resistors 36 and 310, particularly series resistor 36, would provide a constant load on the output, thus reducing efficiency of the converter. As described above, simply providing a resistor across the output of the converter introduces inefficiencies as the operative load connected across the output is increased by the permanent resistive load of the circuit.

The rectifier 316 and capacitor 318 define a rectification circuit for a DC-DC converter. If only these components are included, an unloaded or lightly loaded DC-DC converter would have the output shown in FIG. 1A across the secondary winding. Lightly loaded may be about 1% or less of the full rated load. As described above, preferred embodiments of the present invention introduce an internal load across the output only when the converter is unloaded and presenting an output as shown in FIG. 1A. Preferred embodiments of the present invention also prevent the internal load from being introduced across the output when an external load is connected across the output. The output at the node joining the cathode of rectifier 316 to the first end of capacitor 318 (node 316-318) is therefore a rectified, but potentially unloaded, output from the DC-DC converter. This output is subject to effects caused by the voltage spikes caused by leakage inductance between the primary and secondary windings when there is no load connected across the output.

The output from the node 36-38-310 is therefore compared to the output from node 316-318 by the transistor 312. When the output from node 316-318 rises to a point about 0.6V above the control signal output from node 36-38-310 due to no external load being connected across the DC-DC converter output, the transistor 312 switches on and clamps the internal load resistance 314 across the output, thus presenting a load to the DC-DC converter only when the output voltage exceeds the transistor voltage by an amount greater than the base-emitter voltage rating of the transistor.

In an ideal circuit, secondary winding 32S would present a square wave. The voltage supplied to primary winding 32P is a square wave of an amplitude equal to the supply voltage, and a duty cycle equal to the supply voltage/predetermined voltage. Due to leakage inductances at the secondary winding, the voltage at the secondary winding will peak at an amplitude much higher than the supply voltage, multiplied by the turns ratio of the transformer, if there is no load for the voltage to dissipate across.

When the supply to the primary winding is on, energy is stored in the air gap between the primary and secondary windings. When the supply to the primary winding is switched off, the energy in the air gap dissipates through the secondary winding, and induces a voltage in the secondary winding. When there is a load applied at the output of the circuit, the voltage spike which would be caused by the leakage inductance simply dissipates through the load. The voltage begins to charge capacitor 318, but any extra energy due to the leakage inductance goes to the load. The voltage waveform at the inlet to the capacitor does not spike.

When there is no load across the output, any extra energy due to the leakage inductance passes to capacitor 318 and remains in capacitor 318, as there is nothing for the capacitor 318 to discharge across. The same or similar voltage waveform is presented at capacitor 38, after passing through resistance 36. There, the voltage waveform acts as if it were presented to a loaded circuit. Any extra energy presented at the capacitor 38 dissipates through the load resistance 310. In addition, series resistance 36 and capacitor 38 define a low-pass filter that reduces any voltage spikes. The series resistance 36 preferably has a very small value, for example, about 10 ohms. By providing the series resistance 36 with a very small value, a very small loss is presented to the circuit, much smaller than would be required to permanently connect a load resistance for the main output. The parallel resistance 310, which provides a load to capacitor 38, may have a value of about 20 k ohms. Capacitor 38 may have a capacitance of about 1n farad.

While the secondary winding is conducting, voltage is presented at the top of capacitor 38, through resistance 36 and diode 34 to the base of transistor 312, and to the top of capacitor 318 through diode 316. When the secondary winding stops conducting, the charge in capacitor 38 discharges over resistance 310 and continues to present a constant voltage at the base of transistor 312. As there is no load connected across the main output, the charge in capacitor 318 cannot dissipate because rectifier 316 becomes reverse biased preventing the charge from dissipating over the RC filter and load resistance circuit.

The emitter of transistor 312 is therefore presented with a voltage higher than the predetermined voltage, while the predetermined voltage is presented to the base of transistor 312. Once the voltage at the emitter reaches a point higher than the voltage at the base plus the transistor switching voltage, transistor 312 switches on, and resistor 314 is connected across the load. Accordingly, the overvoltage present at the emitter is able to dissipate through resistor 314, thus maintaining the output voltage at the predetermined voltage.

Because the voltage at the emitter is compared to a control signal having the predetermined voltage, the circuit is able to be applied to a variable DC-DC converter.

The operation of the circuit above is described with respect to a flyback converter. In a forward converter the secondary winding 32S conducts at the same time as primary winding 32P.

Figure 4:
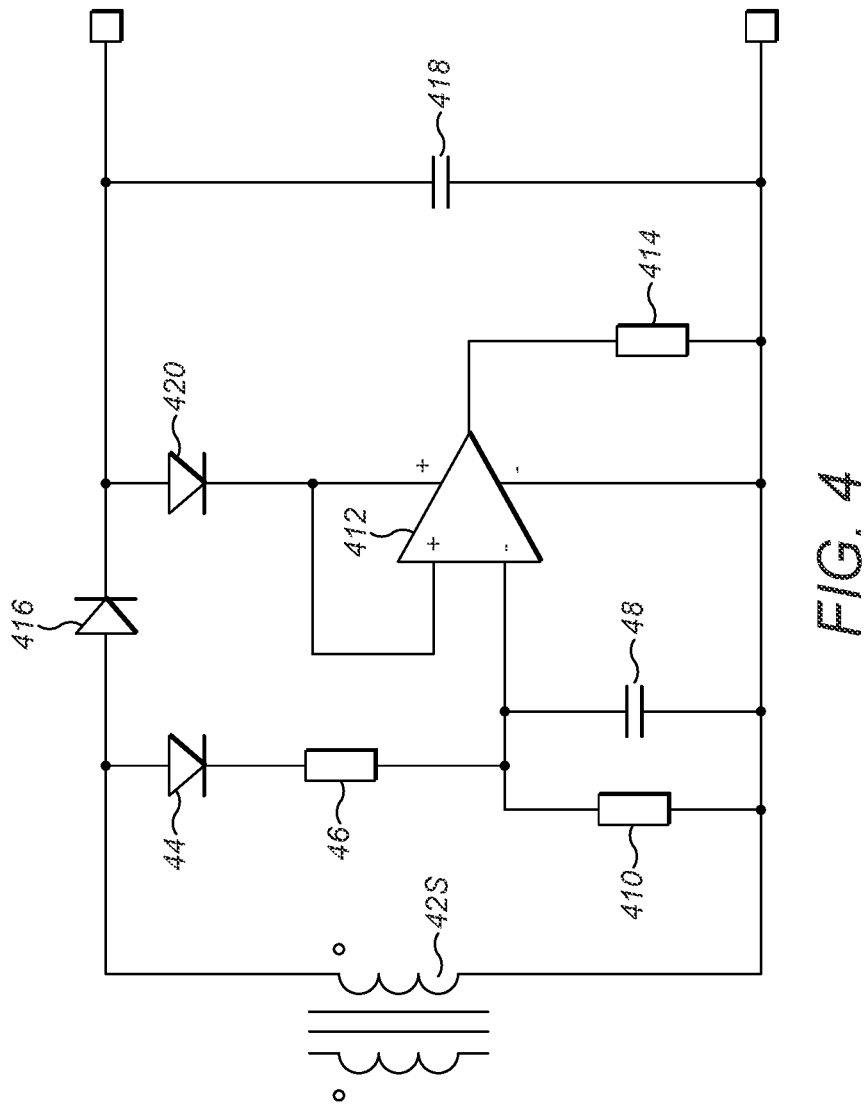
FIG. 4 is a circuit diagram describing a second preferred embodiment of the present invention.

FIG. 4 shows a second preferred embodiment of the present invention in which the transistor 312 of FIG. 3 is replaced by an operational amplifier 412. The initial output circuit of rectifier 44, resistance 46, capacitor 48, and load resistance 410 provide the same or similar connections and operation as in the circuit of FIG. 2 to provide a loaded, filtered, and rectified control signal to one side of the op-amp 412 from the secondary side winding 42S. Rectifier 416 and capacitor 418 provide a final output circuit, which is an unloaded rectified output to the main outputs and also to the other side of the op-amp 412.

Op-amp 412 operates as a comparator. When the voltage at the non-inverting terminal of op-amp 412 becomes higher than the voltage at the inverting terminal, the op-amp 412 saturates and switches in the internal load resistor 414 to load the voltage. Similar to the first preferred embodiment described above, the circuit according to the second preferred embodiment compares a filtered and loaded signal to an unloaded main output, and loading the output when it presents a voltage a certain amount higher than the filtered and loaded signal.

Rectifier 420 provides a voltage drop in the main output signal to the op-amp, which is similar to the base-emitter voltage drop of the transistor, and the internal load resistance is only switched in once the main output voltage rises above the control signal voltage by a predetermined amount, for example, about 0.6V.

Figure 5:
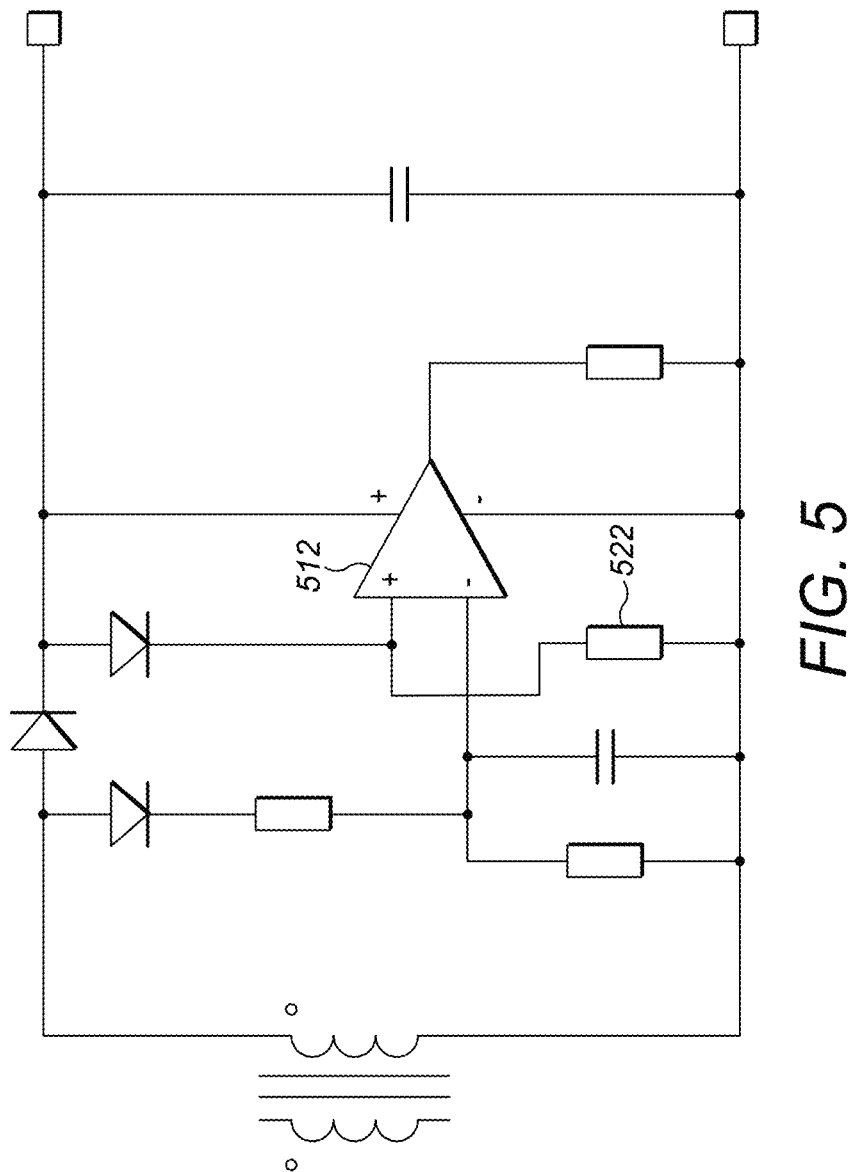
FIG. 5 is a circuit diagram describing a third preferred embodiment of the present invention.

FIG. 5 shows a third preferred embodiment of the present invention in which the input to the power terminal of op-amp 412 is replaced by a single wire and the input to the inverting terminal of op-amp 412 is connected to ground by resistance 522. The circuit shown in FIG. 5 provides the same or substantially the same input voltage to op-amp 512 as the input to op-amp 412 in FIG. 4, and the circuit shown in FIG. 5 operates similar to the circuit shown in FIG. 4.

Figure 6:
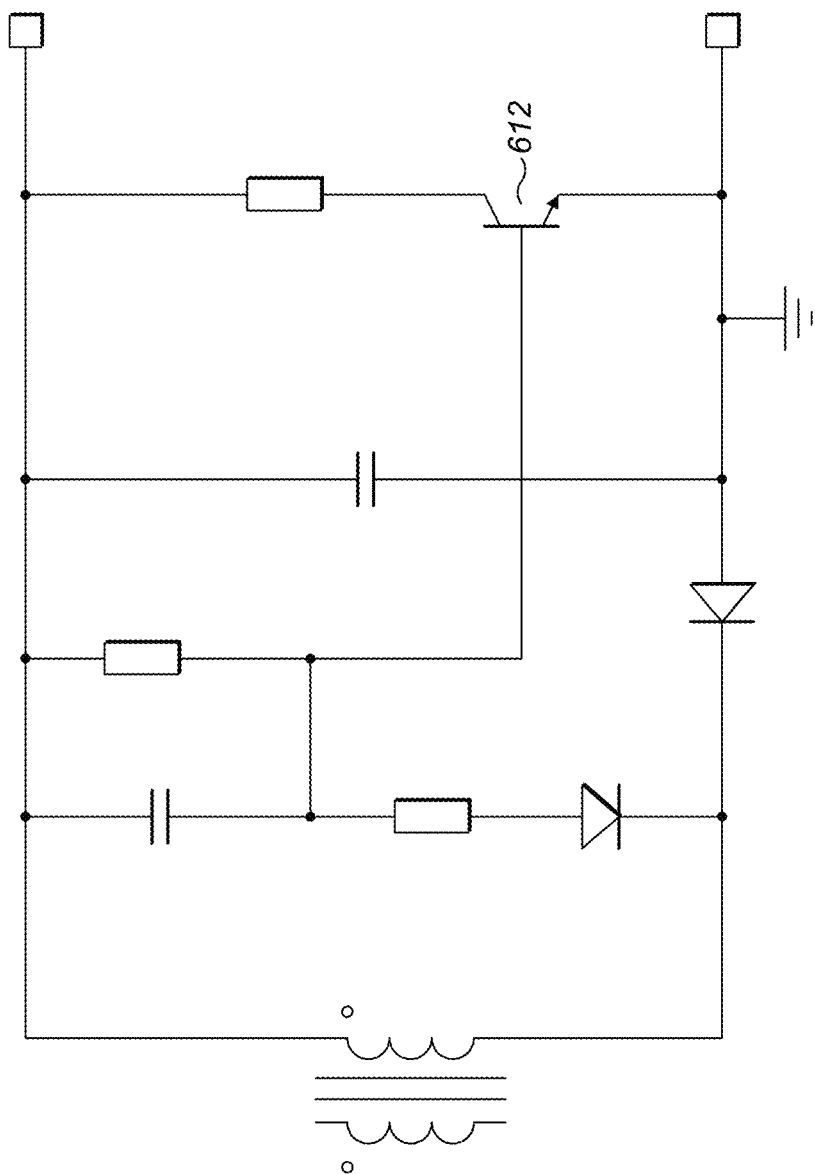
FIG. 6 is a circuit diagram describing a fourth preferred embodiment of the present invention.

FIG. 6 shows a fourth preferred embodiment of the present invention. The circuit shown in FIG. 6 operates by comparing a control signal with a main output signal. However, the transistor included in the circuit shown in FIG. 6 is an NPN transistor 612.

Figure 7:
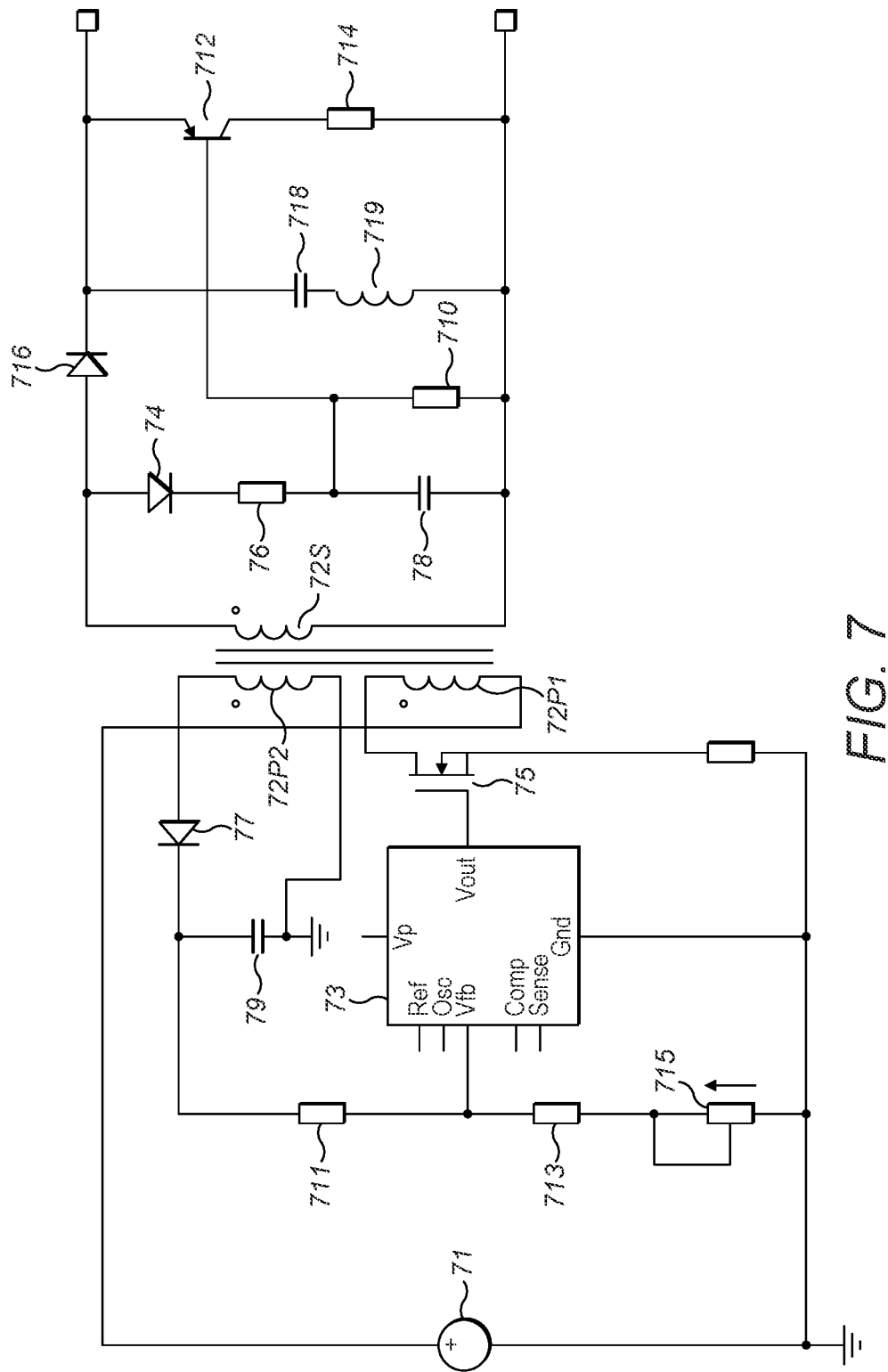
FIG. 7 is a circuit diagram showing a DC-DC converter incorporating a preferred embodiment of the present invention.

FIG. 7 shows a DC-DC flyback converter incorporating a preferred embodiment of the present invention. The following description is for explanation of the DC-DC converter concept only, and the output side circuit is able to be applied to any suitable design of DC-DC flyback converter primary side. DC voltage source provides power to the primary winding 72P1. For a flyback converter, the primary and secondary windings may be provided around a core, similar to a transformer. However, voltage induced in the secondary winding 72S is not induced by 'transformer action'. Energy is stored in an air gap between the primary winding 72P1 and the secondary winding 72S, and thus when the voltage in the primary winding 72P1 collapses, a voltage is induced in the secondary winding 72S.

PWM controller 73 provides a driving voltage to the gate of transistor 75 to switch on and off the supply from DC voltage source 71 to primary winding 72P1. Rectifier 77 and capacitor 79 provide a rectified voltage output from primary winding 72P2. This winding 72P2 is not driven by the voltage source, but instead reflects the instantaneous voltage from secondary winding 72S. That is, primary winding 72P2 is a feedback winding which is connected to a voltage feedback terminal on the PWM controller. The voltage presented at the feedback terminal is compared to an internal reference voltage. By determining whether the feedback voltage is higher or lower than the reference voltage, the PWM 73 controller is able to alter the duty cycle based on the voltage at the output. Through negative feedback, the PWM controller 73 will increase or decrease the duty cycle to maintain the same or substantially the same feedback voltage as the reference voltage. Resistors 711 and 713, in conjunction with variable resistor 715, define a potential divider, and the output from the potential divider is presented at the voltage feedback of the PWM controller.

By varying the resistance of variable resistor 715, the predetermined output voltage of the DC output side is able to be set. The PWM controller 73 will accept an input voltage from the potential divider and translate this voltage into a duty cycle for the Vout terminal driving the gate of the switching transistor 75. Resistor 713 is included to set the maximum output voltage.

When the terminal Vfb supplied by the potential divider from the primary side auxiliary winding 72P2 receives an overvoltage, the duty cycle ratio is set lower. However, at light output loads, the auxiliary winding 72P2 suffers from poor cross-regulation with the secondary windings, meaning that the output voltage can still rise above the predetermined voltage, and there are still problems associated with the minimum duty-cycle of the PWM controller.

If the controller has a fixed duty cycle, the auxiliary winding and feedback circuit would not be required. Components 74, 76, 78, 710, 712, 714, 716 and 718 are able to operate similar to components 24 to 218 of FIG. 2. Although the DC-DC converter of FIG. 7 includes a circuit similar to the circuit shown in FIG. 2, the circuits shown in any of FIGS. 4, 5, and 6 and any other circuit described herein may be included in place of the output circuit.

The preferred embodiments of the present invention are also able to be implemented in a DC-DC forward converter. The preferred embodiments of the present invention applied to the forward converter operate similar to the flyback converter 70 of FIG. 7. However, the operation of the converter itself is different, in that current is induced in the secondary side winding in phase with the primary side winding by the transformer effect. There is no energy stored in an air gap between the primary and secondary windings. The smoothing circuit of the forward converter includes different components to that of the flyback converter, for example, the smoothing circuit of the forward converter includes an inductance 719.

Leakage inductance is a parasitic element of a circuit which may be present in any arrangement of inductors or windings. The circuits described in the above preferred embodiments are therefore suitable for connection to any DC-DC converter or AC-DC converter that may be subjected to problems caused by a minimum on time limitation and/or leakage inductance as described above.

References in the preceding examples to a resistance may be understood to refer to a standard resistive component such as a resistor, or a thin film, metal film, wire wound, carbon film, etc. resistor. Alternatively, references to a resistance may refer to a resistive length of wire or a section of wire of an appropriate length to provide a resistance, or an impedance provided by a component other than a resistor.

References in the preceding examples to a rectifier may be understood to refer to a diode. Alternatively, references to a rectifier may refer to any other component that is able to forward bias a circuit, or to a group of components that provide the same or similar operation.

References in the preceding examples to a transformer indicate that there is a primary winding and a secondary winding that are coupled so that one winding induces a voltage in the other winding. The example of a transformer is not limited to any specific structure or arrangement of windings and a core, and may include no core, a core with an air gap, a solid core, and any number of primary and secondary windings. The example of a transformer is not intended to limit the operation of a primary and secondary winding to inducing voltage via transformer action.

References in the preceding examples to a PNP or NPN transistor may also refer to, respectively, P or N channel field effect transistors (FETs), or any other switch that is able to provide the above-described features, for example, an operation amplifier.

References in the preceding examples to a capacitor may refer to any type of capacitor of a suitable size and voltage rating, for example, a ceramic, film, power film or electrolytic capacitor.

Preferred embodiments of the present invention may be implemented as an embedded converter device, wherein the windings are disposed around a magnetic core embedded in a substrate. The converter device may be included as part of power switching electronic devices.

Described above are a number of preferred embodiments with various optional features. It should be appreciated that, with the exception of any mutually exclusive features, any combination of one or more of the optional features are possible.

Various modifications to the preferred embodiments described above are also possible and will occur to those skilled in the art without departing from the scope of the present invention which is defined by the following claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A variable DC-DC converter, comprising:
   an input circuit connected to a primary winding, the input circuit including an input switch to switch a voltage across the primary winding and a controller to supply a driving frequency to the input switch to output a predetermined voltage;
   an output circuit connected to a secondary winding, the secondary winding including a pair of winding terminals;
   the output circuit including:
     a first rectifier;
     a pair of output terminals coupled respectively to each of the pair of winding terminals;
     a smoothing circuit connected between the pair of output terminals; and
     a voltage clamp connected between the pair of winding terminals, the voltage clamp including:

an output switch, connected between the pair of winding terminals, to connect or disconnect a shunt load between the pair of output terminals;

a low-pass filter connected between the pair of winding terminals and including a filter output, wherein the filter output outputs a control signal to the output switch;

a second rectifier connected in series with the low-pass filter; and a load resistance connected to the filter output to load the low-pass filter, wherein the low-pass filter provides the control signal output to the output switch to connect the shunt load across the pair of winding terminals when an actual voltage across the pair of output terminals becomes higher than the predetermined voltage and to disconnect the shunt load across the pair of winding terminals at other times.

2. The variable DC-DC converter of claim 1, wherein the low-pass filter includes a resistance and a capacitor connected in series across the pair of winding terminals, the low-pass filter being located between the resistance and the capacitor.

3. The variable DC-DC converter of claim 1, wherein the output switch includes a bipolar junction transistor including a base connected to the low-pass filter, and a collector and an emitter connected between the pair of output terminals.

4. The variable DC-DC converter of claim 1, wherein
the output switch includes an operational amplifier;
an inverting input of the operational amplifier is connected to the low-pass filter; and
a non-inverting input and output of the operational amplifier are connected between the pair of output terminals.

5. The variable DC-DC converter of claim 4, wherein
the voltage clamp includes a third rectifier, and
the non-inverting output is connected to the pair of output terminals via the third rectifier.

6. The variable DC-DC converter of claim 5, wherein the first, second, or third rectifiers include diodes.

7. The variable DC-DC converter of claim 1, wherein the smoothing circuit includes a capacitor connected in parallel between the pair of output terminals.

8. The variable DC-DC converter of claim 7, wherein the smoothing circuit further includes an inductor in series with the capacitor.

9. The variable DC-DC converter of claim 1, wherein the variable DC-DC converter is a flyback converter.

10. The variable DC-DC converter of claim 1, wherein the variable DC-DC converter is a forward converter.

11. The variable DC-DC converter of claim 1, wherein the shunt load includes a shunt resistor.

12. The variable DC-DC converter of claim 1, wherein, during operation, the actual voltage across the pair of output terminals becomes higher than the predetermined voltage due to leakage inductance between the primary winding and the secondary winding.

13. The variable DC-DC converter of claim 1, wherein, during operation, the actual voltage across the pair of output terminals becomes higher than the predetermined voltage due to a minimum on-time limitation of the controller.

14. The variable DC-DC converter of claim 1, further comprising a second primary winding connected to the controller via the smoothing circuit and a voltage divider.

15. The variable DC-DC converter of claim 14, wherein the voltage divider is connected to ground and a ground-leg of the voltage divider includes a variable resistance.

16. The variable DC-DC converter of claim 15, wherein a duty cycle of a driving frequency is set by a combination of a second primary winding voltage and the variable resistance.

* * * * *